July 7, 1936.                G. P. DAIGER                2,046,675
                       UNIVERSAL ELECTRIC MOTOR
                         Filed Aug. 24, 1934

INVENTOR
George P. Daiger
BY
Harry S. Bumarse
ATTORNEY

Patented July 7, 1936

2,046,675

UNITED STATES PATENT OFFICE 2,046,675

UNIVERSAL ELECTRIC MOTOR

George P. Daiger, North Canton, Ohio, assignor to The Hoover Company, North Canton, Ohio, a corporation of Ohio Application August 24, 1934, Serial No. 741,198

5 Claims. (Cl. 172—276)

The present invention relates to suction cleaners in general and particularly to a new and novel electrical circuit for a universal type suction cleaner motor combined with a headlight. More specifically the invention comprises a universal electric motor for a suction cleaner or similar tool adapted for use over a range of frequencies and voltages, in combination with a substantially constant voltage electric light which is so connected to the motor circuit that variations in applied voltage and frequency to the motor produce minimum voltage variations across the lamp terminals.

It is an object of the present invention to provide a new and improved combination motor and electric light circuit for a suction cleaner, or similar machine. It is another object of the invention to disclose an improved electrical circuit for an electric motor combined with an electric light circuit, the elements being so related that variations of voltage and frequency across the motor terminals produce minimum variations of voltage across the light. These and other more specific objects will appear upon reading the following specification and claims and upon considering in connection therewith the attached drawing to which they relate.

Referring now to the drawing in which preferred embodiments of the present invention are disclosed:

Small floor tools, such as suction cleaners and floor polishers, are normally provided with a universal electrical motor adapted to run upon direct current and upon alternating currents of various frequencies and voltages. Commonly the motor of such tools is adapted to run upon direct current at a certain voltage and upon alternating currents up to 100 cycles at higher voltages. The motor is designed to deliver equal power outputs throughout this range when the voltage is varied as the frequency varies. This universality of the motor makes possible the use of the machine under different conditions and in different localities.

The inclusion in the small tool of an electric headlight which is so positioned that light rays therefrom are directed forwardly of the machine so as to illuminate the surface being operated upon is an important innovation and one which considerably increases the effectiveness of the machine through making possible a more intelligent operation thereof. For this purpose an electric lamp is used which is connected to the circuit of the motor. In view of the fact that the life of an electric light may be said to vary inversely as the 13th power of the voltage, it is entirely obvious that it is desirable to maintain the voltage on the lamp as nearly constant, and at the voltage for which the lamp was designed, as is possible. In the electrical circuit designed in accordance with the present invention variations in the power supply, both in frequency and in voltage over the range for which the machine motor was designed, produce a minimum voltage variation across the lamp terminals.

Figure 1:
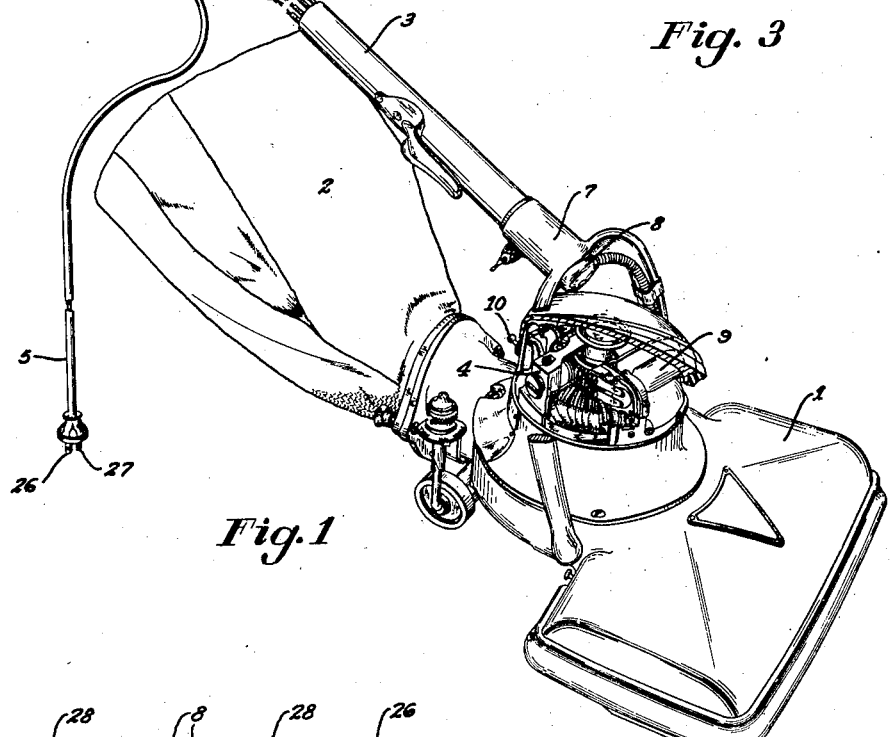
Figure 1 is a showing of a modern suction cleaner including a motor and a headlight, illustrating the type of machine in which the electrical circuit of the present invention is adapted to be embodied.

Referring now to Figure 1 in particular a modern suction cleaner is disclosed comprising a main body 1, a dust bag 2 and a handle 3. Within the motor casing of body 1 is positioned an electric motor, indicated generally by the reference character 4, which is supplied with electricity by incoming power leads of conductor 5. The leads enter the upper end of the handle near the manually operable electric switch 6 and pass downwardly therethrough to the handle ball 7 at which point they are passed through a separable plug 8 and directly into the motor casing. Within the motor casing, and immediately behind a forwardly facing opening therein, is positioned an electric light 9 which is connected to the motor circuit in a manner which will be hereinafter fully disclosed. The switch for the light circuit is indicated at 10 and is positioned at the rear of the motor casing so that the machine may be operated without the light, if desired.

Figure 2:
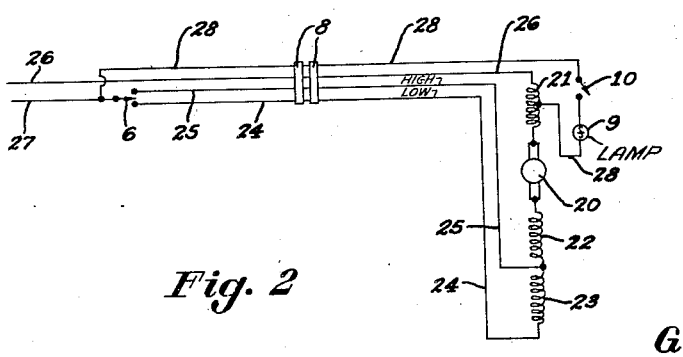
Figure 2 illustrates diagrammatically a preferred embodiment of the invention.

Referring now to Figure 2 in particular a preferred embodiment of the electrical circuit for the motor and the light is disclosed. The motor is seen to comprise an armature 20 and a field winding or windings. On one side of the armature is connected a field winding 21 and upon the opposite side of which are positioned field windings, or divisions of a field winding, 22 and 23. In low speed operation, both field coils 22 and 23 are in series with the armature and field coil 21. In high speed operation field coil 23 is omitted from the current path, and the field strength being reduced, the motor rotates at a higher speed. To make this speed control possible a lead 25 is connected between field coils 22 and 23 and, together with conductors 24 and 26 which connect to the outside terminals of coils 21 and 23, passes through the plug 8 and up to the handle switch 6. Switch 6 is of the three-position type and is adapted to place either lead 24 or lead 25 in series with the incoming power lead 27. Lead 26 does not pass through the switch.

According to this embodiment of the invention the circuit of lamp 9 and switch 10 is formed by a conductor 28 which connects to the incoming lead 27 on the line side of switch 6, passes through the four prong plug 8, connects lamp 9 and switch 10 in series, and is tapped to a midpoint of field coil 21. Being so connected current can pass through the lamp with the motor in either high speed or low speed relationship, the conductor 28 being connected to the incoming power line outside of switch 6. The tap on the field coil 21 is connected so that the voltage across the lamp circuit terminals is substantially constant within the range of terminal voltage and frequency variations across conductors 26 and 27, the resistance of the part of the field coil in series with the lamp being sufficient, upon direct current operation, to effect the proper voltage across the lamp, and the impedance of the same portion, comprising both resistance and reactance, being sufficient in alternating current operation throughout the range of motor use, to produce substantially constant lamp voltage. The reactance varies with the frequency and as the impressed motor voltage is higher with higher frequencies the increase in reactance tends to minimize the voltage change directly across the lamp terminals.

Figure 3:
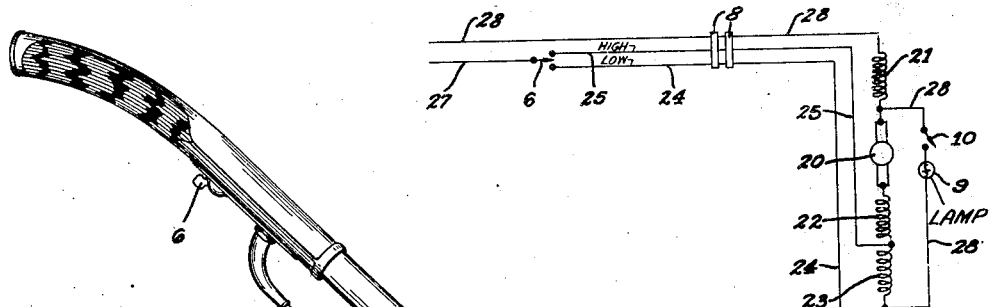
Figure 3 is a diagrammatic illustration of the electrical circuit of a second preferred embodiment.

Referring now to Figure 3 in particular a second preferred embodiment of the invention is disclosed. According to this embodiment the conductor 28 which connects the lamp 9 and its switch 10 to the motor is connected from a point between field coil 21 and armature 20 to the outside of the outer or low speed field coil 23. With the lamp so connected the circuit has the advantage that the plug 8 at the junction of the handle and the handle bail need only be a three prong plug whereas in the first embodiment four prongs were necessary. According to this embodiment the entire field coil 21 is in series with lamp circuit and no intermediate tap on that coil is required. With the motor in high speed operation, in which only field coils 21 and 22 would be connected in series with armature 20, it is seen from the diagram that field coil 23 is in series with the lamp whereas in the low speed operation the lamp circuit is connected in parallel with field coil 23. In high speed operation of the machine the impedance of the coil 23 acts to reduce the voltage directly across the lamp terminal but the transformer action of the same coil tends to increase the voltage thereacross. The result is a reduction in the variation in voltage across the lamp throughout the range of voltages for which the motor is designed.

I claim:

1. In combination, a universal electric motor having an armature and a divided field winding, an electric switch to connect selectively all or part of said winding in series with said armature for low or high speed operation, and an electric light connected in series with a part of the winding of said motor.

2. The structure recited by claim 1 in which said light is connected to an incoming power source beyond said switch and is in parallel with said armature and all but a part of said field winding.

3. In combination with a universal motor including an armature and field windings connected thereto and in series therewith, one of said field windings being divided and there being switch means to connect selectively all or only part thereof to a source of power, and a light adapted for a lower-than-motor voltage tapped to a mid-point of a second field winding and connected to the power supply on its opposite side.

4. In combination with a universal motor adapted for use with electric power sources varying in frequency and applied voltage, the voltage increasing with the frequency, and comprising an armature and a field winding, an electric light connected in series with a portion of said field winding having resistance and reactance, characterized in that the resistance and reactance of said field winding portion minimize the voltage variations across said light as the impressed voltage across said motor is varied with different frequencies, the reactance of said field winding portion increasing with the frequency.

5. In combination with a universal motor including an armature and field windings connected thereto and in series therewith, one of said field windings being divided and there being switch means selectively to connect said armature and all or only part of said windings to a source of power, and a light adapted for a lower-than-motor voltage connected across said armature and said divided winding, said light being connected in parallel with said armature and the entire divided winding when all of said winding is connected to a source of power, and being connected in series with a part of said winding when only a part thereof is connected to a source of power, the part of said winding when in series with said light being subjected to a transformer action tending to raise the lamp voltage.

GEORGE P. DAIGER.